United States Patent
Hiyoshi et al.

(10) Patent No.: US 8,521,386 B2
(45) Date of Patent: Aug. 27, 2013

(54) AUTOMATIC STOP-AND-START DEVICE FOR ENGINE

(75) Inventors: Takeo Hiyoshi, Fujisawa (JP); Tomoko Ohta, Fujisawa (JP); Tatsuhiko Ebara, Fujisawa (JP); Takashi Shima, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 676 days.

(21) Appl. No.: 12/514,355

(22) PCT Filed: Oct. 16, 2007

(86) PCT No.: PCT/JP2007/070123
§ 371 (c)(1),
(2), (4) Date: May 11, 2009

(87) PCT Pub. No.: WO2008/062615
PCT Pub. Date: May 29, 2008

(65) Prior Publication Data
US 2010/0076656 A1    Mar. 25, 2010

(30) Foreign Application Priority Data
Nov. 21, 2006  (JP) .................................. 2006-314287

(51) Int. Cl.
*G06G 7/00*     (2006.01)

(52) U.S. Cl.
USPC .............. 701/70; 701/22; 701/51; 701/54; 701/61; 701/104; 701/112

(58) Field of Classification Search
USPC ............ 701/22, 51, 54, 61, 70, 104, 112; 123/350; 180/65.2, 65.6
See application file for complete search history.

(56) References Cited

U.S. PATENT DOCUMENTS 1,397,883 A * 11/1921 Shadle ........................... 246/45
2,809,723 A * 10/1957 Howze ....................... 188/106 F
(Continued)

FOREIGN PATENT DOCUMENTS

JP      62-131949       6/1987
JP      09-151781       6/1997
(Continued)

OTHER PUBLICATIONS

International Search Report for Serial No. PCT/JP2007/070123 dated Nov. 8, 2007.

*Primary Examiner* — Khoi Tran
*Assistant Examiner* — Jorge Peche
(74) *Attorney, Agent, or Firm* — McCormick, Paulding & Huber LLP

(57) ABSTRACT

A vehicle is reliably prevented from rolling back during automatic start on a slope or the like. An automatic stop-and-start device includes an engine control unit 10 that automatically stops an engine 2 when a predetermined stop condition is fulfilled and automatically starts the engine 2 when a predetermined start condition is fulfilled; a brake device 3 that imparts a brake force to a vehicle that carries the engine 2; and a brake control unit 16 that holds a brake state produced by the brake device 3 when a predetermined brake hold request condition is fulfilled and releases the brake state produced by the brake device 3 when a predetermined brake release condition is fulfilled. The engine control unit 10 determines whether the brake control unit 16 holds the brake state produced by the brake device 3 and automatically starts the engine 2 when the determination is affirmed.

8 Claims, 2 Drawing Sheets

(56) References Cited

U.S. PATENT DOCUMENTS

| | | | |
|---|---|---|---|
| 3,862,782 A * | 1/1975 | Horowitz et al. | 303/40 |
| 6,371,889 B1 * | 4/2002 | Kuroda et al. | 477/181 |
| 6,763,903 B2 * | 7/2004 | Morimoto et al. | 180/65.26 |
| 7,226,389 B2 * | 6/2007 | Steen et al. | 477/195 |
| 7,693,636 B2 * | 4/2010 | Katou et al. | 701/54 |
| 2002/0074173 A1 * | 6/2002 | Morimoto et al. | 180/65.2 |
| 2006/0184304 A1 * | 8/2006 | Katou et al. | 701/54 |
| 2007/0054773 A1 * | 3/2007 | Braun et al. | 477/4 |

FOREIGN PATENT DOCUMENTS

| | | |
|---|---|---|
| JP | 2002-307983 A | 10/2002 |
| JP | 2003-260960 A | 9/2003 |
| JP | 2004-124923 A | 4/2004 |
| JP | 2004-308645 A | 11/2004 |
| JP | 2005-023837 A | 1/2005 |

* cited by examiner

AUTOMATIC STOP-AND-START DEVICE FOR ENGINE

CROSS REFERENCE TO RELATED APPLICATIONS

This application is entitled to the benefit of and incorporates by reference essential subject matter disclosed in International Patent Application No. PCT/JP2007/070123 filed on Oct. 16, 2007 and Japanese Patent Application No. 2006-314287 filed Nov. 21, 2006.

TECHNICAL FIELD

The present invention relates to an automatic stop-and-start device for an engine, and more particularly to an automatic stop-and-start device for an engine that is suitable as an idling stop-and start system (ISS) of a vehicle.

BACKGROUND OF THE INVENTION

An automatic stop-and-start device of an engine is used as an idling stop-and start system (ISS) of a vehicle and automatically stops the engine when a predetermined stop condition is fulfilled and automatically starts the engine when a predetermined start condition is fulfilled (see, for example, Japanese Patent Application Laid-Open No. 2003-260960). With such an automatic stop-and-start device, by automatically stopping the engine in an idling state such as during stopping and parking of vehicle, and automatically starting (restarting) the engine when the vehicle is started, it is possible to lower fuel consumption and reduce the generation of exhaust gas and noise.

DISCLOSURE OF THE INVENTION

In the above-described automatic stop-and-start device, when the engine is automatically started, brake control is sometimes simultaneously performed to hold the brake state of the brake device in order to prevent the vehicle from rolling back when it is started on a slope.

In this case, when power necessary to start the engine automatically is supplied to a starter, a voltage drop temporarily occurs in the vehicle power source system. As a result, it is possible that a voltage necessary to actuate the brake device will not be obtained and that a brake force necessary to prevent the vehicle from rolling back during automatic start on a slope will not be ensured.

Accordingly it is an object of the present invention to provide an automatic stop-and-start device for an engine that can reliably prevent a vehicle from rolling back during automatic start on a slope or the like.

In order to attain the above-describe object, the present invention provides an automatic stop-and-start device for an engine comprising an engine control unit that automatically stops the engine when a predetermined stop condition is fulfilled and automatically starts the engine when a predetermined start condition is fulfilled; a brake device that imparts a brake force to a vehicle that carries the engine; and a brake control unit that holds a brake state produced by the brake device when a predetermined brake hold request condition is fulfilled and releases the brake state produced by the brake device when a predetermined brake release condition is fulfilled, wherein the engine control unit determines whether the brake control unit holds the brake state produced by the brake device and automatically starts the engine when the determination is affirmed.

The brake control unit may release the brake state produced by the brake device when a predetermined time elapses after a complete explosion in the engine caused by the automatic start of the engine.

The brake control unit may notify the engine control unit to the effect that the brake state produced by the brake device is held when the brake state produced by the brake device is held; and the engine control unit may recognize that the brake control unit holds the brake state produced by the brake device on the basis of the notification from the brake control unit.

The present invention demonstrates an excellent effect of making it possible to reliably prevent a vehicle from rolling back during automatic start on a slope or the like.

DETAILED DESCRIPTION OF THE PREFERRED EMBODIMENTS

The preferred embodiment of the present invention will be described below in greater detail with reference to the appended drawings.

The automatic stop-and-start device of the present embodiment is used as an idling stop-and-start system (ISS) of a vehicle.

Figure 1:
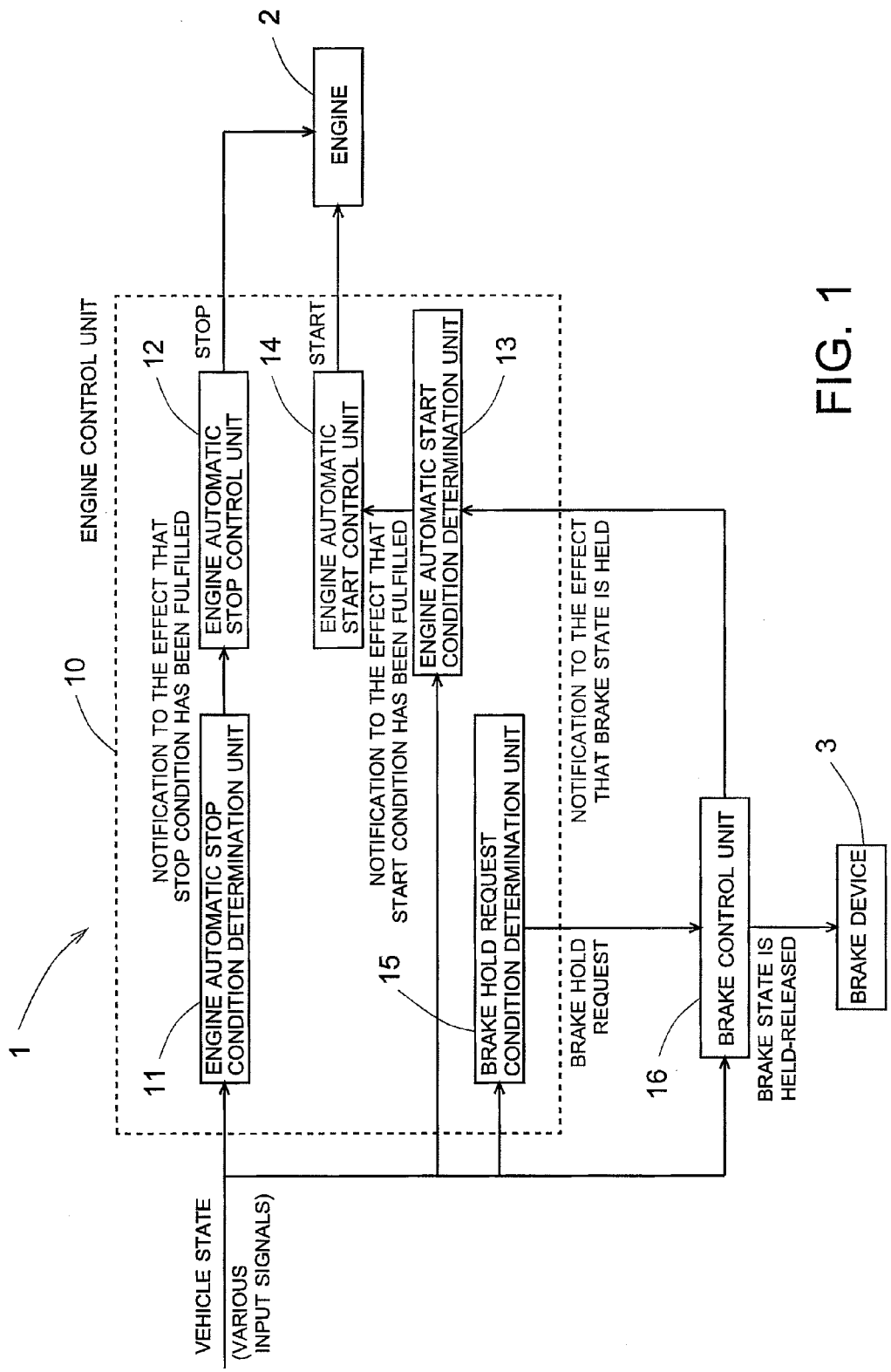
FIG. 1 is a schematic diagram of an automatic start-and-stop device for an engine of an embodiment of the present invention.

As shown in FIG. 1, an automatic stop-and-start device 1 of the present embodiment is provided with an engine control unit 10 (referred to hereinbelow as engine ECU) for controlling an engine 2 (diesel engine, gasoline engine, and the like).

A variety of devices such as an engine revolution sensor, a vehicle speed sensor, a gear neutral switch, an ignition key switch, an ISS main switch, a door switch, a parking brake switch, a foot brake switch (not shown in the figure) are connected to the input side of the engine ECU 10, and signals (vehicle state) from these devices are inputted into the engine ECU 10.

A variety of devices such as a fuel injector, an air intake controller, and a starter (not shown in the figure) are connected to the output side of the engine ECU 10, and the engine ECU 10 outputs signals to these devices.

The engine ECU 10 has an engine automatic stop condition determination unit 11 that determines whether a predetermined stop condition has been fulfilled on the basis of a vehicle state and an engine automatic stop control unit 12 that automatically stops the engine 2 when the engine automatic stop condition determination unit 11 affirms the stop determination (the predetermined stop condition has been fulfilled).

Examples of the predetermined stop condition are presented below.
(1) An ignition switch is ON.
(2) A main switch of ISS is ON.
(3) The engine 2 is in idling.
(4) The vehicle speed is zero.
(5) A gear is in neutral (a shift lever position is N).
(6) A parking brake has been actuated.
(7) A foot brake has been released.
(8) A failure of a function necessary for automatic stop has not been found by vehicle failure diagnostics.
(9) No idling control prohibition request is issued by other on-board systems.

The condition (3) is fulfilled when an output signal of the engine revolution sensor indicates an idling revolution speed. The condition (4) is fulfilled when an output signal of the vehicle speed sensor is zero. The condition (5) is fulfilled when the gear neutral switch is ON (during neutral determination). The condition (6) is fulfilled when the parking brake switch is ON (during parking brake actuation determination). The condition (7) is fulfilled when the foot brake switch is OFF.

When the engine ECU 10 serving as the engine automatic stop condition determination unit 11 affirms the stop determination, the engine ECU 10 serving as the engine automatic stop control unit 12 outputs a fuel cut signal to the fuel injector. As a result, the fuel injector stops fuel injection and the engine 2 is stopped. The automatic stop (in other words, idling stop) of the engine 2 is thus realized.

Only some of the above-described conditions (1) to (9) may be employed as the aforementioned predetermined stop conditions, or other conditions may be added to the conditions (1) to (9).

The engine ECU 10 also has an engine automatic start condition determination unit 13 that determines whether a predetermined start condition has been fulfilled on the basis of a vehicle state and an engine automatic start control unit 14 that automatically starts the engine 2 when the engine automatic start condition determination unit 13 affirms the start determination (the predetermined start condition has been fulfilled).

Examples of the predetermined start condition are presented below.

(10) The ignition key switch is ON.
(11) The main switch of ISS is ON.
(12) A failure of a function necessary for automatic start has not been found by vehicle failure diagnostics.
(13) A gear is in neutral (a shift lever position is N).
(14) A door is closed.
(15) No idling control prohibition request is issued by other on-board systems.
(16) A parking brake has been actuated.
(17) A foot brake has been pushed.

The condition (13) is fulfilled when the gear neutral switch is ON (during neutral determination). The condition (14) is fulfilled when a door switch is OFF. The condition (16) is fulfilled when the parking brake switch is ON (during parking brake actuation determination). The condition (17) is fulfilled when the foot brake switch is ON.

When the engine ECU 10 serving as the engine automatic start condition determination unit 13 affirms the start determination, the engine ECU 10 serving as the engine automatic start control unit 14 outputs an ON signal to the starter. As a result, the starter is rotation driven and the engine 2 is started. The automatic start (in other words, restart after idling stop) of the engine 2 is thus realized.

Only some of the above-described conditions (10) to (17) may be employed as the aforementioned predetermined stop conditions, or other conditions may be added to the conditions (10) to (17).

The engine ECU 10 is also provided with a brake hold request condition determination unit 15 that determines whether a predetermined brake hold request condition has been fulfilled on the basis of an operation state of the vehicle during automatic stop of the engine 2.

In the present embodiment, the predetermined brake hold request condition is fulfilled when a driver steps on a foot brake to restart (automatic start) the engine 2 and the push-down amount of the foot brake is equal to or larger than a predetermined amount.

The engine ECU 10 serving as the brake hold request condition determination unit 15 outputs a brake hold request signal to the below-described brake ECU 16 when a brake hold request determination is affirmed.

The automatic stop-and-start device 1 of the present embodiment is provided with a brake device 3 that imparts a brake force to the vehicle and a brake control unit 16 (referred to hereinbelow as brake ECU) that holds the brake state produced by the brake device 3 when the predetermined brake hold request condition is fulfilled and cancels the brake state produced by the brake device 3 when a predetermined brake cancel condition is fulfilled.

In the present embodiment, a hill start aid device is used as the brake device 3. For example, the hill start aid device includes a tank storing compressed air, a brake actuator that is actuated by a supply of compressed air from the tank, a brake control valve that is provided between the brake actuator and the air tank and controls the supply and discharge of compressed air to the brake actuator, and a brake hold valve that is provided in a passage between the brake control valve and the brake actuator and cuts off the compressed air flow and holds the brake state when switched ON.

The brake ECU 16 outputs an ON signal to the brake device 3 when the predetermined brake hold request condition is fulfilled (in the present embodiment, when a brake hold request signal from the engine ECU 10 is inputted). As a result, the compressed air is not discharged from the brake actuator when the foot brake is stepped on and the brake state produced by the brake device 3 is held.

In the present embodiment, the engine ECU 10 automatically starts the engine 2 when the brake ECU 16 determines whether the brake state produced by the brake device 3 is held (whether the predetermined brake hold condition has been fulfilled) and affirms this determination (brake hold condition determination).

In the present embodiment, the brake ECU 16 notifies the engine ECU 10 to the effect that the brake state produced by the brake device 3 is held when the brake state is held by the brake device 3 (in the present embodiment, a brake state hold signal is outputted to the engine ECU 10). When the engine ECU 10 affirms the start condition determination after receiving the brake state hold notification from the brake ECU 16 (in the present embodiment, after the brake state hold signal from the brake ECU 16 has been inputted), the engine ECU 10 serving as the engine automatic start control unit 14 outputs an ON signal to the starter.

In other words, in the present embodiment, the engine ECU 10 recognizes that the brake ECU 16 holds the brake state produced by the brake device 3 on the basis of notification (control signal) from the brake ECU 16.

The engine ECU 10 outputs an engine complete explosion signal to the brake ECU 16 when a predetermined time (for example, 1 sec) elapses after an output signal of the engine revolution sensor exceeds a complete explosion revolution speed. When the predetermined brake release condition is fulfilled (in the present embodiment, when an engine complete explosion signal from the engine ECU 10 is received), the brake ECU 16 outputs an OFF signal to the brake device 3 so as to release the brake state produced by the brake device 3. As a result, the discharge of compressed air supplied to the brake actuator is allowed, and the brake state produced by the brake device 3 is released. The "engine complete explosion" as referred to herein is a state in which a series of ignition and spark loss cycles occurring during engine start has ended.

The operation of the present embodiment will be explained below.

In the present embodiment, the engine ECU 10 determines whether the brake ECU 16 holds the brake state produced by the brake device 3 and automatically starts the engine 2 when the determination is affirmed.

Thus, in the present embodiment, the brake device 3 is actuated prior to automatic start of the engine 2, and the start of the engine 2 is initiated after the brake device 3 has been confirmed to hold the brake state.

As a result, even when a voltage drop temporarily occurs in a vehicle power source system due to power supply to the starter, a voltage (brake force) that is necessary for holding the brake state produced by the brake device 3 and lower that a voltage necessary to actuate the brake device 3 can be ensured and the brake state produced by the brake device 3 is held. Therefore, the vehicle can be reliably prevented from rolling back during automatic start at a slope or the like.

Furthermore, in the present embodiment, the foot brake is pushed when the engine 2 is automatically started. Therefore, the vehicle can be more reliably prevented from rolling back during automatic start at a slope or the like.

In the present embodiment, the brake ECU 16 releases the brake state produced by the brake device 3 when a predetermined time has passed after a complete explosion of the engine 2 caused by the automatic start of the engine 2.

As a result, oil pressure in the transmission rises to a level sufficient to engage a clutch and the clutch is engaged. Therefore, the vehicle can be reliably prevented from rolling back during automatic start on a slope or the like.

Moreover, in the present embodiment, the brake ECU 16 notifies the engine ECU 10 to the effect that the brake state produced by the brake device 3 is held when the brake state produced by the brake device 3 is held, and the engine ECU 10 recognizes that the brake ECU 16 holds the brake state produced by the brake device 3 on the basis of the notification (control signal) from the brake ECU 16.

As a result, it is not necessary to confirm mechanically the actuation of the brake device 3. Therefore, the actuation of the brake device 3 can be recognized with a simple configuration.

Figure 2:
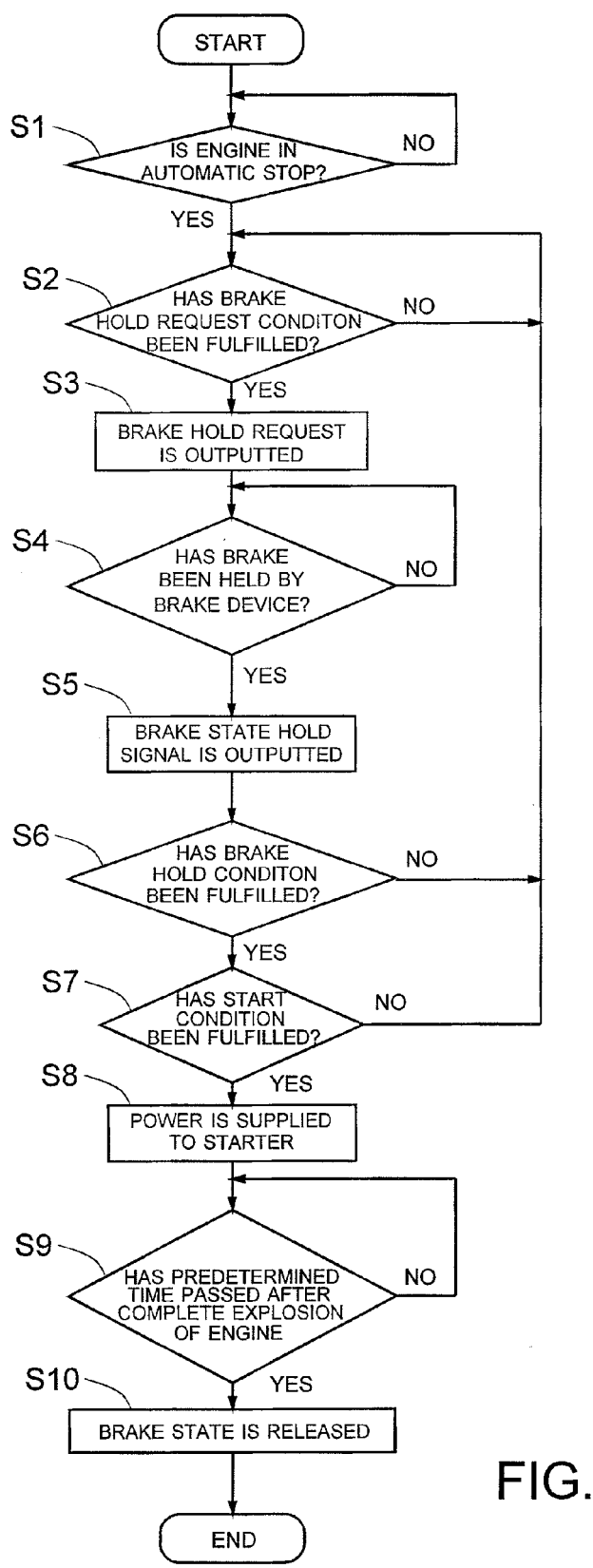
FIG. 2 is a control flowchart.

A control flow chart of automatic start of the engine 2 will be explained below by using FIG. 2.

In step S1, the engine ECU 10 determines whether the engine 2 has been automatically stopped by idling stop.

Where the determination of step S1 is affirmed, the processing advances to step S2 and the engine ECU 10 determines whether the brake hold request condition has been fulfilled. Where the determination of step S2 is affirmed, the processing advances to step S3 and the engine ECU 10 outputs a brake hold request signal.

In step S4, it is determined whether the brake ECU 16 holds the brake state produced by the brake device 3. Where the determination of step S4 is affirmed, the processing advances to step S5 and the brake ECU 16 outputs a brake state hold signal.

Then, in step S6, the brake ECU 16 determines whether the brake hold condition is fulfilled.

Where the determination of step S6 is affirmed, the processing advances to step S7 and the engine ECU 10 determines whether the start condition is fulfilled.

Where the determination of step S7 is affirmed, the processing advances to step S8 and the engine ECU 10 performs current conduction to the starter.

Then, in step S9, the engine ECU 10 determines whether a predetermined time has elapsed after a complete explosion of the engine 2. Where the determination of step S9 is affirmed, the brake ECU 16 releases the brake state produced by the brake device 3 in step S10.

Where the determination of step S1 is negated, the determination of step S1 is performed again. Where the determinations of steps S2, 6, 7 are negated, the determination of step S2 is performed again. Where the determination of step S4 is negated, the determination of step S4 is performed again. Furthermore, where the determination of step S9 is negated, the determination of step S9 is performed again.

The preferred embodiment of the present invention is described above. However, the present invention is not limited to this embodiment and a variety of other embodiments can be employed.

For example, in the above-described embodiment, the engine ECU 10 recognizes that the brake ECU 16 holds the brake state produced by the brake device 3 on the basis of the notification (control signal) from the brake ECU 16, but such a configuration is not limiting and a configuration may be employed in which the brake device 3 is provided with a pressure sensor that detects a brake pressure and the engine ECU 10 recognizes that the brake ECU 16 holds the brake state produced by the brake device 3 when a detected value of the pressure sensor exceeds a predetermined value and this state is maintained for a predetermined time.

What is claimed is:

1. An automatic idling stop-and-start device for an engine, comprising:
    an engine control unit that automatically stops the engine when a predetermined stop condition is fulfilled and automatically starts the engine when a predetermined start condition is fulfilled;
    a brake device that imparts a brake force to a vehicle that carries the engine and holds a brake state by cutting off a compressed air flow by a brake control valve provided between an air tank and a brake actuator; and
    a brake control unit that holds the brake state produced by the brake device when a predetermined brake hold request condition is fulfilled and releases the brake state produced by the brake device when a predetermined brake release condition is fulfilled, wherein
    the brake hold request condition is fulfilled when a push-down amount of a foot brake is equal to or larger than a predetermined amount, in order to restart the engine after the engine has stopped automatically, and
    the engine control unit determines whether the brake device holds the brake state by cutting off the compressed air flow, and automatically starts the engine when the determination is affirmed.

2. The automatic stop-and-start device for an engine according to claim 1, wherein the brake control unit releases the brake state produced by the brake device when a predetermined time elapses after a complete explosion in the engine caused by the automatic start of the engine.

3. The automatic stop-and-start device for an engine according to claim 1, wherein
    the stop condition includes a condition that the foot brake has been released.

4. The automatic stop-and-start device for an engine according to claim 2, wherein
    the stop condition includes a condition that the foot brake has been released.

5. The automatic stop-and-start device for an engine according to claim 1, wherein
    the brake control unit notifies the engine control unit to the effect that the brake state produced by the brake device is held when the brake state produced by the brake device is held; and the engine control unit recognizes that the brake control unit holds the brake state produced by the brake device on the basis of the notification from the brake control unit.

6. The automatic stop-and-start device for an engine according to claim 2, wherein the brake control unit notifies the engine control unit to the effect that the brake state produced by the brake device is held when the brake state produced by the brake device is held; and the engine control unit recognizes that the brake control unit holds the brake state produced by the brake device on the basis of the notification from the brake control unit.

7. The automatic stop-and-start device for an engine according to claim 3, wherein the brake control unit notifies the engine control unit to the effect that the brake state produced by the brake device is held when the brake state produced by the brake device is held; and the engine control unit recognizes that the brake control unit holds the brake state produced by the brake device on the basis of the notification from the brake control unit.

8. The automatic stop-and-start device for an engine according to claim 4, wherein the brake control unit notifies the engine control unit to the effect that the brake state produced by the brake device is held when the brake state produced by the brake device is held; and the engine control unit recognizes that the brake control unit holds the brake state produced by the brake device on the basis of the notification from the brake control unit.

* * * * *